(12) United States Patent
Kodaira et al.

(10) Patent No.: US 11,970,080 B2
(45) Date of Patent: Apr. 30, 2024

(54) INFORMATION PROCESSING APPARATUS, INFORMATION PROCESSING SYSTEM, COMPUTER READABLE RECORDING MEDIUM AND INFORMATION PROCESSING METHOD

(71) Applicant: HONDA MOTOR CO., LTD., Tokyo (JP)

(72) Inventors: Kazuhiro Kodaira, Saitama (JP); Yasuhiro Iwaki, Saitama (JP); Syouji Inose, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 17/453,862

(22) Filed: Nov. 8, 2021

(65) Prior Publication Data
US 2022/0203865 A1   Jun. 30, 2022

(30) Foreign Application Priority Data

Dec. 25, 2020  (JP) ................. 2020-217969

(51) Int. Cl.
*B60L 58/16* (2019.01)
*B60L 58/12* (2019.01)
*B60L 58/24* (2019.01)

(52) U.S. Cl.
CPC ............ *B60L 58/16* (2019.02); *B60L 58/12* (2019.02); *B60L 58/24* (2019.02)

(58) Field of Classification Search
CPC .......... B60L 58/16; B60L 58/12; B60L 58/24; B60L 2240/545; B60L 2240/547; B60L 2240/549; B60L 3/12; B60L 2240/622; B60L 2240/642; B60L 2240/662; B60L 2240/667; B60L 3/0007; B60L 58/21; B60L 3/0046; G06Q 50/06; G06F 18/24
See application file for complete search history.

(56) References Cited

U.S. PATENT DOCUMENTS 8,755,821 B2 * 6/2014 Brisebois ............. H04W 4/027
                                                         455/456.6
2017/0054317 A1 * 2/2017 Katsuki ................ G01R 31/392
(Continued)

FOREIGN PATENT DOCUMENTS

JP    2018128769 A    8/2018
JP    2019176641 A    10/2019
(Continued)

OTHER PUBLICATIONS

Office Action issued for counterpart Japanese Application No. 2020-217969, issued by the Japanese Patent Office dated Sep. 20, 2022 (drafted on Sep. 15, 2022).

*Primary Examiner* — Tung S Lau

(57) ABSTRACT

Provided is an information processing apparatus distributed in a member configured to be removable in a mobile object, the information processing apparatus including: a type information obtaining unit, configured to obtain type information to distinguish at least one of a type and an application of the mobile object, when the member is installed in the mobile object; and a mobile object determination unit, configured to determine at least one of a type and an application of the mobile object installed by the member, based on the type information obtained by the type information obtaining unit.

19 Claims, 5 Drawing Sheets

(56) References Cited

U.S. PATENT DOCUMENTS

| | | | |
|---|---|---|---|
| 2018/0156873 | A1 | 6/2018 | Matsuyama |
| 2018/0222343 | A1 | 8/2018 | Uchida |
| 2020/0386561 | A1 | 12/2020 | Namiki |

FOREIGN PATENT DOCUMENTS

| | | | |
|---|---|---|---|
| JP | 2020190480 | A | 11/2020 |
| WO | 2016194082 | A1 | 12/2016 |
| WO | 2020153477 | A1 | 7/2020 |
| WO | 2020153481 | A1 | 7/2020 |

\* cited by examiner

INFORMATION PROCESSING APPARATUS, INFORMATION PROCESSING SYSTEM, COMPUTER READABLE RECORDING MEDIUM AND INFORMATION PROCESSING METHOD

The contents of the following Japanese patent application are incorporated herein by reference:

NO. 2020-217969 filed in JP on Dec. 25, 2020.

BACKGROUND

1. Technical Field

The present invention relates to an information processing apparatus, an information processing system, a computer readable recording medium and an information processing method.

2. Related Art

Patent Document 1 discloses that a server for determining a candidate for replacement of an assembled battery installed in a vehicle from a plurality of assembled batteries including reused ones (i) obtains the degradation state of the assembled batteries, (ii) selects an assembly battery having a life longer than the period until the time of replacement of the plurality of assembled batteries by calculating the distance (life) that can be traveled before the remained capacity ratio of the assembled battery reaches the threshold value Qth, and (iii) determines a candidate for replacement using the selection result and cost information.

PRIOR ART DOCUMENTS

Patent Document

Patent Document 1: Japanese Patent Application Publication No. 2018-128769

DESCRIPTION OF EXEMPLARY EMBODIMENTS

Hereinafter, the present invention will be described through embodiments of the invention, but the following embodiments do not limit the claimed invention. In addition, not all combinations of features described in the embodiments necessarily have to be essential to solving means of the invention. Note that identical or similar portions in figures are given identical reference numbers and the same explanation is omitted in some cases.

[Overview of a Reuse Assistance System 100]

Figure 1:
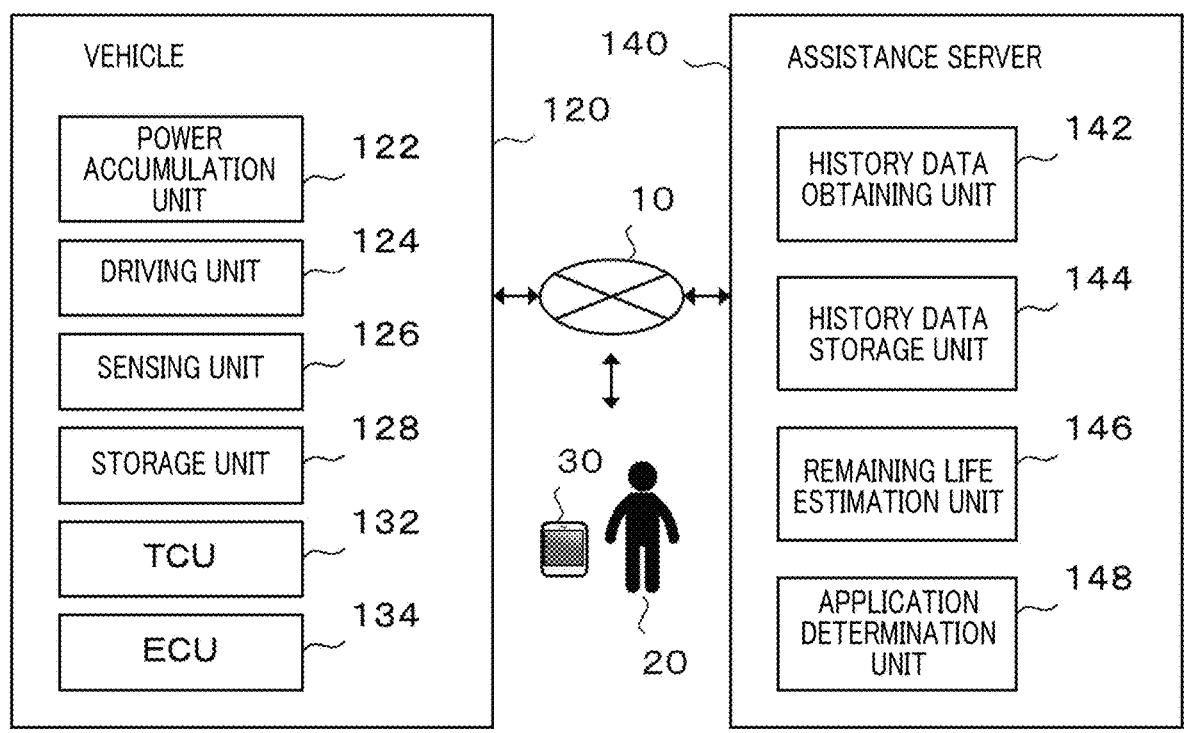
FIG. 1 schematically illustrates one example of a system configuration of a reuse assistance system 100.

FIG. 1 schematically illustrates one example of a system configuration of the reuse assistance system 100. In the present embodiment, the reuse assistance system 100 includes a vehicle 120 and an assistance server 140. In the present embodiment, the vehicle 120 includes a power accumulation unit 122, a driving unit 124, a sensing unit 126, a storage unit 128, a TCU 132 and an ECU 134. The vehicle 120 may include a plurality of power accumulation units 122. The vehicle 120 may include a plurality of ECUs 134. In the present embodiment, the assistance server 140 includes a history data obtaining unit 142, a history data storage unit 144, a remaining life estimation unit 146, and an application determination unit 148.

In the present embodiment, the vehicle 120 and the assistance server 140 can transmit and receive information from each other via a communication network 10. In one embodiment, the vehicle 120 transmits the information stored in the storage unit 128 to the assistance server 140. In another embodiment, the vehicle 120 transmits a recording apparatus (not illustrated in FIG. 1) installed in the power accumulation unit 122 to the assistance server 140. Furthermore in another embodiment, the vehicle 120 transmits information indicating the output results of the sensing unit 126 to the assistance server 140.

In the present embodiment, the vehicle 120 and the assistance server 140 can transmit and receive information to and from the communication terminal 30 of the user 20 who utilizes the service provided by the reuse assistance system 100 via the communication network 10. In one embodiment, the communication terminal 30 accesses the storage unit 128 and obtains the information stored in the storage unit 128. The communication terminal 30 transmits the information obtained from the storage unit 128 to the assistance server 140. In another embodiment, the power accumulation unit 122 is accessed to obtain information stored in the recording apparatus (not illustrated in FIG. 1) installed in the power accumulation unit 122. The communication terminal 30 transmits the information obtained from the power accumulation unit 122 to the assistance server 140.

In the present embodiment, the details of the reuse assistance system 100 are explained using the case where the power accumulation unit 122 is reused as a power accumulation apparatus for other devices that use electrical energy after being installed and used in the vehicle 120. In the present embodiment, the reuse assistance system 100 utilizes, for example, information collected by the vehicle 120 or a portion thereof to determine other devices to reuse the power accumulation unit 122. More specifically, the power accumulation unit 122 includes a recording apparatus (not illustrated in FIG. 1), and the details of the reuse assistance system 100 are explained using the example of a case in which the assistance server 140 utilizes the information stored on the recording apparatus of the power accumulation unit 122 to determine other devices to which the power accumulation unit 122 is to be reused.

As the other device that uses the above-mentioned electrical energy, a mobile object, transportation equipment, a power source and the like are exemplified. As the mobile object, a vehicle, a flying object, a marine vessel and the like are exemplified. As the transportation equipment, a mobile object, a lifter, a conveyor, an elevator, an escalator, and a belt conveyor and the like are exemplified. The power source may be a portable power source, or may be a stationary power source.

As the vehicle, an automobile, a motorcycle, a bicycle, a vehicle for standing ride with a power unit, a working machine, a train and the like are exemplified. As the automobile, an electric vehicle, a fuel cell vehicle (FCV), a hybrid vehicle, a small communicator, an electronic cart and the like are exemplified. As the motorcycle, a bicycle, a three-wheeled bicycle and the like are exemplified. A bicycle may be a bicycle with an electric motor. The bicycle with an electric motor may be an electric bicycle, or may be an electrically power assisted bicycle. As the flying object, an air plane, an air ship or a balloon, a hot-air balloon, a helicopter, a drone and the like are exemplified. As the marine vessel, a ship, a hovercraft, a water bike, a submarine, a submersible craft, an underwater scooter and the like are exemplified. As a working machine, a forklift, a cultivator, a lawn mower and the like are exemplified.

On the other hand, in recent years, various sensors have been installed in vehicles 120 or parts thereof (in some cases simply referred to as vehicles 120), and data related to a wide variety of items can be collected. In the case where the assistance server 140 utilizes the information collected by the vehicle 120 to determine other devices to which the power accumulation unit 122 is to be reused, the vehicle 120 or the assistance server 140 may record data related to all items that can be collected in a recording apparatus, and the assistance server 140 may access the recording apparatus to obtain data related to the necessary items, as needed.

However, it is not economical for unnecessary data to be stored for a long period of time until the power accumulation unit 122 is finally disposed of or recycled as a resource. Also, considering that, for example, the vehicle 120 or the power accumulation unit 122 can be distributed from one place to another in the second-hand market, it is preferable that these data are recorded in a recording apparatus installed in the vehicle 120 or the power accumulation unit 122 for at least a predetermined period of time, in order to prevent the dissipation of useful data.

On the other hand, there is a limit to the recording capacity of the recording apparatus installed in the vehicle 120 or the power accumulation unit 122. In such a case, a technique for collecting data over a relatively long period of time is to reduce the number of data items collected or to increase the sampling interval of the data.

In the present embodiment, the vehicle 120 or the power accumulation unit 122 reduces the capacity of the data used in the process of determining where to reuse the power accumulation unit 122 by reducing the number of data items collected. More specifically, the inventors noted that among the items for which the vehicle 120 or the power accumulation unit 122 can collect data, the items that have a significant impact on the determination of where to reuse the power accumulation unit 122 are relatively limited.

For example, the progress level of degradation of the power accumulation unit 122 has a significant impact on the determination of where to reuse the power accumulation unit 122. The progress level of degradation of the power accumulation unit 122 is highly dependent on the use of the power accumulation unit 122. And the use of the power accumulation unit 122 depends on the type or application of the vehicle 120 with a power accumulation unit 122 installed therein.

Therefore, with the reuse assistance system 100 according to the present embodiment, first, when the power accumulation unit 122 is installed in the vehicle 120, for example, the power accumulation unit 122 obtains a type code for distinguishing at least one of the type and application of the vehicle 120. As the type of the vehicle 120, a generic term, a vehicle type, a model and the like are exemplified. As a generic term, automobile, hybrid vehicle, electric vehicle, fuel battery vehicle, motorcycle, electric motorcycle, bicycle, electric bicycle and the like are exemplified. As the vehicle type, heavy-duty vehicle, medium-duty vehicle, light-duty vehicle, passenger vehicle, cargo vehicle, and a combination of these are exemplified. As the application of the vehicle 120, private use, commercial use and the like are exemplified.

Note that the timing for the power accumulation unit 122 to obtain the type code is not limited to immediately after the power accumulation unit 122 is installed in the vehicle 120. In one embodiment, the power accumulation unit 122 obtains the type code stored in the storage unit 128 during the manufacturing process or commissioning process of the vehicle 120 after the power accumulation unit 122 is installed in the vehicle 120. In another embodiment, the power accumulation unit 122 obtains the type code stored in the storage unit 128 after the power accumulation unit 122 is installed in the vehicle 120 and before the vehicle 120 is delivered to the purchaser or user of the vehicle 120.

Next, for example, the power accumulation unit 122 determines at least one of the type and application of the vehicle 120 with a power accumulation unit 122 installed therein based on the above-mentioned type code. The power accumulation unit 122 also determines which items, among the items that the vehicle 120 or the power accumulation unit 122 can collect, should be recorded in the recording apparatus installed in the vehicle 120 or the power accumulation unit 122.

For example, the power accumulation unit 122 determines the items that are stored (sometimes referred to as "stored items") in a recording apparatus installed in the vehicle 120 or the power accumulation unit 122, among the items that are related (sometimes referred to as "related items") to at least one of the usage state and degradation state of the power accumulation unit 122 installed in the vehicle 120. Based on at least one of the determined type and application of the vehicle 120, the power accumulation unit 122 may determine a stored item from among one or more related items that the vehicle 120 or the power accumulation unit 122 can collect.

This can save the resources of the recording apparatuses distributed in the vehicle 120, the power accumulation unit 122, or the assistance server 140. In addition, the calculation amount and calculation time in the process of determining where to reuse the power accumulation unit 122 can be reduced. Furthermore, since the amount of data collected is reduced, the transmission time of the collected data to the assistance server 140 is also reduced. In this way, for example, the estimation of the remaining life is speeded up.

Also, according to the reuse assistance system 100 of the present embodiment, the assistance server 140 determines where to reuse the power accumulation unit 122 by utilizing the information stored in the recording apparatus installed in the vehicle 120 or the power accumulation unit 122. For example, the assistance server 140 obtains information stored in a recording apparatus installed in the vehicle 120 or the power accumulation unit 122. The assistance server 140 estimates the remaining life of the power accumulation unit 122 by referring to the above-mentioned information. Also, the assistance server 140 also determines where to reuse the power accumulation unit 122 based on the estimated remaining life of the power accumulation unit 122. For example, the assistance server 140 determines the next application of the power accumulation unit 122 when it is removed from the vehicle 120 and reused. As an above-mentioned application, the assistance server 140 may then determine the type of device in which the power accumulation unit 122 is to be installed.

This allows, for example, the reuse assistance system 100 to provide a service to the user 20 to assist the reuse of the power accumulation unit 122 installed in the vehicle 120. Also, according to the present embodiment, the power accumulation unit 122 can be effectively utilized throughout the entire life cycle of the power accumulation unit 122. Furthermore, the reuse of one or more power accumulation units 122 can be properly managed.

For example, depending on the degradation of the power accumulation unit 122 installed in the vehicle 120, reusing the power accumulation unit 122 (or a part of it) as a battery for electric bicycles may be over-specified. However, according to the reuse assistance system 100 of the present embodiment, the above-mentioned power accumulation unit 122 is first reused as a battery for light-duty vehicles, electric motorcycles for sharing services and so on. Then, at a time point when the degradation of the above-mentioned power accumulation unit 122 has further progressed, the reuse assistance system 100 proposes to reuse the above-mentioned power accumulation unit 122 as a battery for electric bicycles, for example, taking into account the usage state and degradation state of the power accumulation unit 122 throughout its life cycle.

[Overview of Elements Related to the Reuse Assistance System 100]

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a dedicated line, a VPN, an electrical power communication line, an Inter-vehicle communication line, a road-to-vehicle communication line, and the like. The communication network 10: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user 20 utilizes the reuse assistance system 100. For example, when the power accumulation unit 122 installed in the vehicle 120 is to be removed from the vehicle 120 and reused, the user 20 utilizes the reuse assistance system 100 to determine where to reuse the power accumulation unit 122.

The communication terminal 30 is utilized by the user 20. The communication terminal 30, for example, functions as an interface between the reuse assistance system 100 and the user 20. The communication terminal 30 may be a device that can transmit and receive information to and from each unit of the reuse assistance system 100 (for example, the assistance server 140) via the communication network 10 and the details are not specifically limited thereto. As the communication terminal 30, a personal computer, a mobile terminal and the like can be exemplified. As the mobile terminal, a mobile phone, a smartphone, a PDA, a tablet, a notebook computer or a laptop computer, a wearable computer and the like can be exemplified.

The vehicle 120 moves by utilizing the electrical energy accumulated in the power accumulation unit 122. As the vehicle 120, an automobile, a motorcycle, a bicycle, a vehicle for standing ride with a power unit, a train and the like are exemplified. As the automobile, an electric vehicle, a hybrid vehicle, an electronic cart and the like are exemplified. The automobile may be a gasoline vehicle or a fuel battery vehicle with a power accumulation unit 122 installed therein.

In the present embodiment, the power accumulation unit 122 accumulates electrical energy. The power accumulation unit 122 supplies electrical power to each unit of the vehicle 120. The power accumulation unit 122 is configured to be removable from the vehicle 120. In one embodiment, the power accumulation unit 122 is configured to be able to be easily attached and removed by the user of the vehicle 120 himself. The power accumulation unit 122 may be a replaceable or portable battery. A replaceable or portable battery is replaced with a new, charged battery when the remaining capacity of the battery is low. In another embodiment, the power accumulation unit 122 is configured in such a way that it can not be easily removed by the user of the vehicle 120 himself, but can be removed by a maintenance shop, dealer, or other business operator. The power accumulation unit 122 may be a fixed battery. The fixed battery is charged while installed in the vehicle 120.

In the present embodiment, the driving unit 124 moves the vehicle 120 using the electrical power supplied from the power accumulation unit 122. The driving unit 124 may have a motor to drive the vehicle 120.

In the present embodiment, the sensing unit 126 obtains information about the usage state of the vehicle 120. The sensing unit 126 may output information about the usage state of the vehicle 120 to the assistance server 140 via the TCU 132. In this case, the information about the usage state of the vehicle 120 is, for example, stored in the history data obtaining unit 142. The sensing unit 126 may also output the information about the usage state of the vehicle 120 to the ECU 134. In this case, the information about the usage state of the vehicle 120 is, for example, stored in the storage unit 128.

The usage state of the vehicle 120 can affect the usage state and/or degradation state of the power accumulation unit 122. Accordingly, at least a part of the information output by the sensing unit 126 may be one example of the information about at least one of the usage state and degradation state of the power accumulation unit 122.

The sensing unit 126 outputs data on various items related to at least one of the usage state and degradation state of the power accumulation unit 122. In one embodiment, the sensing unit 126 outputs information indicating the measured value. In another embodiment, the sensing unit 126 outputs information indicating that the measured value is greater than a predetermined threshold when the measured value exceeds the predetermined threshold.

As the data item output by the sensing unit 126, at least one of the number of power accumulation apparatuses actually installed in the vehicle 120, the geographical location of the vehicle 120, the acceleration of the vehicle 120, the number or frequency with which the acceleration of the vehicle 120 exceeds a predetermined first threshold, the magnitude of the impact applied to the vehicle 120, the number or frequency with which the magnitude of the impact applied to the vehicle 120 exceeds a predetermined second threshold, the inclination of the vehicle 120, the number or frequency with which the inclination of the vehicle 120 exceeds a predetermined third threshold, and moving distance of the vehicle 120 is exemplified. The geographical location of the vehicle 120 may be considered as the geographical location of the power accumulation unit 122. The acceleration of the vehicle 120 may be considered as the acceleration of the power accumulation unit 122. The magnitude of the impact applied to the vehicle 120 may be considered as the magnitude of the impact applied to the power accumulation unit 122.

The sensing unit 126 may have one or a plurality of (sometimes referred to simply as one or more) sensors. As the above-mentioned sensor, at least one of a positioning sensor that estimates the self-position of the vehicle 120, a mounting detection sensor that detects the number of power accumulation units 122 actually installed in the vehicle 120, an abnormality detection sensor that detects abnormalities occurred in the vehicle 120, a temperature sensor that measures the temperature of the outside air of the vehicle 120, a humidity sensor that measures the humidity of the outside air of the vehicle 120, a temperature sensor that measures the temperature at a specific location inside the vehicle 120, a humidity sensor that measures the humidity at a specific location inside the vehicle 120, an acceleration sensor that measures the acceleration of the vehicle 120, an angular acceleration sensor that measures angular acceleration of the vehicle 120, a vibration sensor that measures the magnitude of vibration of the vehicle 120, an inclination sensor that measures the magnitude of inclination of a vehicle 120, an impact sensor that detects the magnitude of impact applied to the vehicle 120, and a distance sensor that measures the moving distance of the vehicle 120 is exemplified. As a positioning sensor, a GPS signal receiver, an acceleration sensor, a rotary encoder and the like are exemplified.

In the present embodiment, the storage unit 128 stores various types of information. The storage unit 128, for example, in response to an access request from another device, extracts the data requested by the access request and outputs the extracted data to the another device.

In one embodiment, the storage unit 128 stores various types of information output by the power accumulation unit 122. For example, the storage unit 128 stores information about at least one of the usage state and degradation state of the power accumulation unit 122. The storage unit 128 may store information indicating the time of day and information about at least one of the usage state and degradation state of the power accumulation unit 122 at the time of day, in a corresponding manner.

In another embodiment, the storage unit 128 stores the various types of information output by the sensing unit 126. The storage unit 128 may store the information indicating the time and the information indicating the output of the sensing unit 126 at that time in a corresponding manner. As described above, at least a part of the information output by the sensing unit 126 may be one example of information about at least one of the usage state and degradation state of the power accumulation unit 122.

Furthermore, in another embodiment, the storage unit 128 stores information about the specifications of the vehicle 120 or each unit thereof. As the above-mentioned specification, the number of power accumulation units 122 that can be installed in the vehicle 120, the inclination of the power accumulation units 122 when the power accumulation units 122 are properly installed in the vehicle 120, the rated voltage of the power accumulation units 122, the rated current of the power accumulation units 122, the rated capacity of the power accumulation units 122 and the like are exemplified.

Furthermore, in another embodiment, the storage unit 128 stores the type code of the vehicle 120. As described above, the type code of the vehicle 120 is information to distinguish at least one of the types and applications of the vehicle 120, and is output from the vehicle 120 to the power accumulation unit 122 when the power accumulation unit 122 is installed in the vehicle 120.

The inclination of the power accumulation unit 122, when the power accumulation unit 122 is normally installed in the vehicle 120, may be the inclination of the power accumulation unit 122 when the power accumulation unit 122 is normally installed in the vehicle 120 distributed on a horizontal plane. In one embodiment, the inclination of the power accumulation unit 122 is represented as the smaller angle of, for example, the angle between the reference directions set for the power accumulation unit 122 and the vertical direction. In another embodiment, the inclination of the power accumulation unit 122 is represented as the angle of rotation of the power accumulation unit 122 around each of three orthogonal axes passing through and orthogonal to the center of gravity of the power accumulation unit 122, set in the power accumulation unit 122. When the front-back, left-right, and up-down directions of the power accumulation unit 122 are determined, the above three axes are represented, for example, as (i) an x-axis running through the power accumulation unit 122 in the front-back direction with the center of gravity of the power accumulation unit 122 at the center, (ii) a y-axis running through the power accumulation unit 122 in the left-right direction with the center of gravity of the power accumulation unit 122 at the center, and (iii) a z-axis running through the power accumulation unit 122 in the up-down direction with the center of gravity of the power accumulation unit 122 at the center.

In the present embodiment, the TCU 132 (telematics control unit) controls the connection between the vehicle 120 and the communication network 10. The TCU 132 may control communication between each unit of the vehicle 120 and at least one of the communication terminal 30 and the assistance server 140.

In one embodiment, the TCU 132 receives the data output by the sensing unit 126 and transmits the data to the assistance server 140. In another embodiment, the TCU 132 receives various requests from the assistance server 140 and transfers the requests to the ECU 134. Further, in another embodiment, the TCU 132 controls the transmission of data from the ECU 134 to the assistance server 140.

In the present embodiment, the ECU 134 controls the operation of each unit of the vehicle 120. The ECU 134 also responds to requests from the assistance server 140 and performs processing to respond to such requests. The ECU 134 may transmit the results of the execution of the above process to the assistance server 140. For example, the ECU 134 transmits information about the power accumulation unit 122 stored in the storage unit 128 to the assistance server 140 in response to a request from the assistance server 140.

The ECU 134 may manage information about the vehicle 120. For example, the ECU 134 detects that the power accumulation unit 122 has been installed in the vehicle 120. When it is detected that the power accumulation unit 122 is installed in the vehicle 120, the ECU 134 outputs the type code of the vehicle 120 stored in the storage unit 128 to the power accumulation unit 122.

In the present embodiment, the assistance server 140 provides a service to the user 20 to assist the reuse of the power accumulation unit 122. The assistance server 140 may obtain instructions or requests from the user 20 via the communication terminal 30. The assistance server 140 may present the information to the user 20 via the communication terminal 30.

In the present embodiment, the history data obtaining unit 142 obtains information from the vehicle 120 or the power accumulation unit 122 regarding at least one of the usage state and degradation state of the power accumulation unit 122. The history data obtaining unit 142 may obtain data on specific related items among the data on one or more related items that the vehicle 120 or the power accumulation unit 122 can collect. The history data obtaining unit 142 may obtain data (sometimes referred to as history data) that corresponds to the information indicating the time and the information indicating the contents of each of the one or more related items at that time.

The history data obtaining unit 142 may store information about at least one of the usage state and degradation state of the power accumulation unit 122 in the history data storage unit 144. For example, for each of the one or more power accumulation units 122, the history data obtaining unit 142 stores the identification information of each power accumulation unit and the history data described above in the history data storage unit 144 in a corresponding manner.

In the present embodiment, the history data storage unit 144 stores information about at least one of the usage state and degradation state of each of the one or more power accumulation units 122. For example, for each of the one or more power accumulation units 122, the history data storage unit 144 stores the identification information of each power accumulation unit and the history data described above in a corresponding manner.

In the present embodiment, the remaining life estimation unit 146 estimates the remaining life of the power accumulation unit 122. The remaining life estimation unit 146 may estimate the remaining life of the power accumulation unit 122 by referring to the information stored in the history data obtaining unit 142. As described above, the history data obtaining unit 142 stores information about at least one of the usage state and degradation state of the power accumulation unit 122. Therefore, for example, the remaining life estimation unit 146 estimates the current degradation state of the power accumulation unit 122, based on information about at least one of the usage state and degradation state of the power accumulation unit 122. Also, the remaining life estimation unit 146 estimates the remaining life of the power accumulation unit 122 based on the current degradation state of the power accumulation unit 122. As an estimation technique of the remaining life of the power accumulation unit 122, a known estimation technique or a newly developed estimation technique in the future, may be employed.

In the present embodiment, the application determination unit 148 determines the next application when the power accumulation unit 122 is removed from the vehicle 120 and reused, based on the remaining life of the power accumulation unit 122 estimated by the remaining life estimation unit 146. The above application may then be the type of device in which the power accumulation unit 122 is installed. As the type of the device, vehicle, marine vessel, flying object, transportation equipment, working machine, power sources and the like are exemplified. The type of the device may be further subdivided than the above-mentioned classification. As the subdivided type of the device, automobile, electronic cart, motorcycle, bicycle, boat, drone, water pump, high-pressure washer, power sprayer, blower, elevator, cultivator, snow plow, lawn mower, grass cutter, brush cutter, walking assist device, stationary power source, portable power source and the like are exemplified. This can determine a candidate for the reuse of the power accumulation unit 122.

In the present embodiment, the application determination unit 148 may transmit information indicating the next application of the power accumulation unit 122 to the communication terminal 30 of the user 20. The user 20 can determine where to reuse the power accumulation unit 122 by referring to the information presented by the assistance server 140.

As described above, the application determination unit 148 determines the next application of the power accumulation unit 122, taking into account the usage of the power accumulation unit 122 during the period when the power accumulation unit 122 was installed in the vehicle 120. If the power accumulation unit 122 has been installed in one or more power-using devices in the past, the application determination unit 148 can also determine the next application of the power accumulation unit 122, taking into account the usage of the power accumulation unit 122 during the period when the power accumulation unit 122 was installed in these power-using devices. Therefore, by the user 20 determining where to reuse the power accumulation unit 122 with reference to the information presented by the assistance server 140, the power accumulation unit 122 can be effectively utilized throughout the life cycle of the power accumulation unit 122. In addition, the reuse of one or more power accumulation units 122 can be properly managed.

[Specific Configuration of Each Unit of the Reuse Assistance System 100]

Each unit of the reuse assistance system 100 may be realized by hardware, software, or a combination of hardware and software. Each unit of the reuse assistance system 100 may be, at least partially, realized by a single server or a plurality of servers. Each unit of the reuse assistance system 100 may be, at least partially, realized on a virtual machine or cloud system. Each unit of the reuse assistance system 100 may be, at least partially, realized by a personal computer or mobile terminal. As the mobile terminal, a mobile phone, a smartphone, a PDA, a tablet, a notebook computer or a laptop computer, a wearable computer and the like can be exemplified. Each unit of the reuse assistance system 100 may store information utilizing a distributed ledger technology or distributed network such as a block chain.

If at least some of components constituting the reuse assistance system 100 are realized by software, the components realized by the software may be realized by activating, in an information processing apparatus having a general configuration, software or a program stipulating operations about the components. The above-described information processing apparatus with a general configuration may include (i) a data processing apparatus having a processor such as a CPU or a GPU, a ROM, a RAM, a communication interface and the like, (ii) an input apparatus such as a keyboard, a pointing device, a touch panel, a camera, a voice/sound input apparatus, a gesture input apparatus, various kinds of sensors, a GPS receiver, and (iii) an output apparatus such as a display apparatus, a voice/sound output apparatus, a vibration apparatus, and (iv) a recording apparatus (including an external recording apparatus) such as a memory, an HDD, an SSD and the like.

In the above-mentioned information processing apparatus with a general configuration, the above-mentioned data processing apparatus or recording apparatus may record the above-mentioned software or program. Upon being executed by a processor, the above-described software or program causes the above-described information processing apparatus to execute operations stipulated by the software or program. The software or the program described above may also be stored in a non-transitory computer readable recording medium. The software or program described above may be a program that allows a computer to function as the reuse assistance system 100 or a part thereof. The software or program described above may be a program for causing a computer to perform an information processing method in the reuse assistance system 100 or a part thereof.

In one embodiment, the information processing method in each unit of the reuse assistance system 100 relates to the information processing for determining the vehicle 120. The above-mentioned information processing method is executed by, for example, a computer of the power accumulation unit 122.

The above-mentioned information processing method includes obtaining type information to obtain type information for distinguishing at least one of the types and applications of the mobile objects by the information processing apparatus distributed to a member, when the member, which is configured to be removable from the mobile objects, is installed in the mobile objects, for example. The above-mentioned information processing method includes determining a mobile object to determine at least one of the types and applications of the mobile objects in which a member is installed, based on the type information obtained during obtaining type information by the information processing apparatus, for example.

In another embodiment, the information processing method in each unit of the reuse assistance system 100 relates to the information processing for determining data items stored in the power accumulation unit 122, the storage unit 128 or the history data storage unit 144. The above-mentioned information processing method is executed by a computer of the vehicle 120, the power accumulation unit 122 or the assistance server 140, for example.

The above-mentioned information processing method includes obtaining type information to obtain type information for distinguishing the mobile objects by at least one of the types and applications of the mobile objects, for example. The above-mentioned information processing method includes determining items to determine, based on the type information obtained by the type obtaining unit, items stored in a first storage apparatus among one or more items related to at least one of the usage state and degradation state of a member installed in the mobile objects, for example. In the above-mentioned information processing method, the first storage apparatus stores information indicating at least one of the usage state and degradation state of the member for each of the one or more members, for example. The first storage apparatus may be one example of a first storage unit.

In another embodiment, the information processing method in each unit of the reuse assistance system 100 relates to the information processing to assist the reuse of members installed in the mobile objects. The information processing to assist the reuse of members installed in the mobile objects may be information processing to determine a next application of the power accumulation unit 122, which is installed in the vehicle 120. The above-mentioned information processing method is executed by a computer of the assistance server 140, for example.

The above-mentioned information processing method refers to the information stored in the first storage apparatus and includes estimating remaining life to estimate the remaining life of the members, for example. In the above-mentioned information processing method, the first storage apparatus stores information indicating at least one of the usage state and degradation state of the member for each of the one or more members, for example. The first storage apparatus may be one example of the first storage unit. The above-mentioned information processing method includes determining application to determine a next application when the members are removed from the mobile objects and reused, based on the remaining life of the members estimated during estimating remaining life, for example.

The reuse assistance system 100 may be one example of the information processing apparatus or the information processing system. The vehicle 120 may be one example of the mobile object. The power accumulation unit 122 may be one example of the member or the power accumulation apparatus. The power accumulation unit 122 may be one example of the information processing apparatus. The sensor included in the sensing unit 126 may be one example of the sensor installed in the mobile object. The type code may be one example of the type information. The recording apparatus installed in the vehicle 120 or the power accumulation unit 122 may be one example of the first storage unit. The history data storage unit 144 may be one example of the first storage unit.

One Example of Another Embodiment

In the present embodiment, a case is exemplified where the application determination unit 148 determines a next application of the power accumulation unit 122, taking the usage of the power accumulation unit 122 during a period when the power accumulation unit 122 is installed in the vehicle 120 into account, to describe one example of the application determination unit 148 in detail. However, the application determination unit 148 is not limited to the present embodiment.

In another embodiment, the application determination unit 148 may determine a next application of the power accumulation unit 122, taking into account (i) the usage of the power accumulation unit 122 during the period when the power accumulation unit 122 is installed in the vehicle 120, (ii) the storage of the power accumulation unit 122 during the period when the power accumulation unit 122 is removed from the vehicle 120 and stored. In this way, until the next application of the power accumulation unit 122 is determined, even if the power accumulation unit 122 has been stored for a relatively long period, the application determination unit 148 can determine properly the next application of the power accumulation unit 122.

Figure 2:
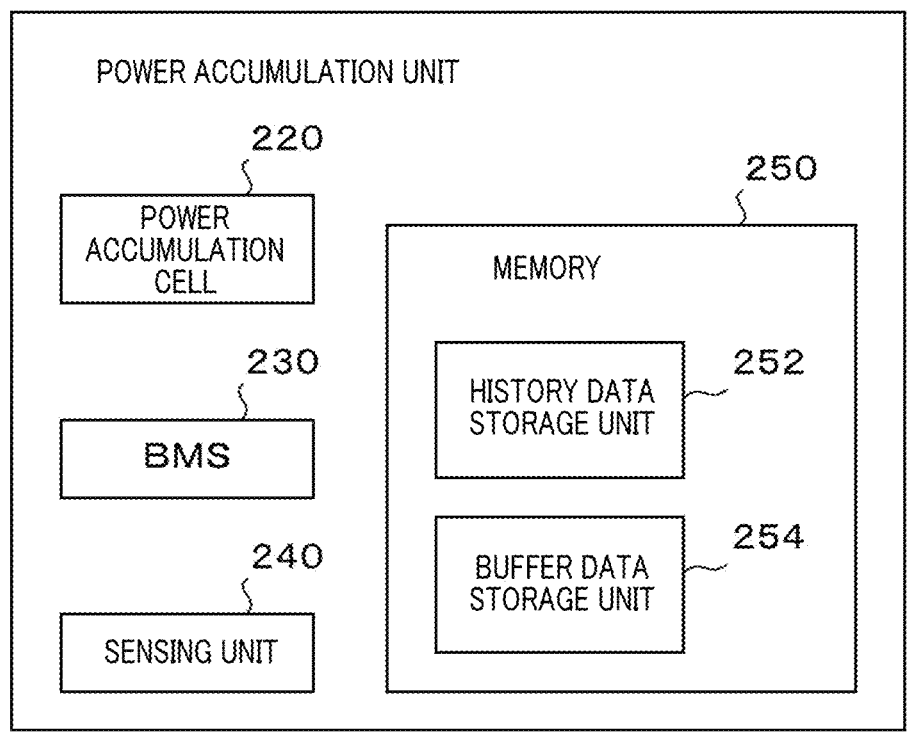
FIG. 2 schematically illustrates one example of an internal configuration of an power accumulation unit 122.

FIG. 2 schematically illustrates one example of an internal configuration of the power accumulation unit 122. In the present embodiment, the power accumulation unit 122 includes an electric storage cell 220, a BMS 230, a sensing unit 240 and a memory 250. The power accumulation unit 122 may include a plurality of electric storage cells 220. In the present embodiment, the memory 250 has a history data storage unit 252 and a buffer data storage unit 254.

In the present embodiment, the electric storage cell 220 accumulates electrical energy. The electric storage cell 220 supplies electrical power to each unit of the vehicle 120. For example, with the control of the BMS 230, when the electric storage cell 220 is electrically connected with the power line of the vehicle 120 (not illustrated), electrical power is supplied from the electric storage cell 220 to each unit of the vehicle 120. On the other hand, with the control of the BMS 230, when the electric storage cell 220 is electrically disconnected with the power line of the vehicle 120 (not illustrated), the electrical power supply to each unit of the vehicle 120 from the electric storage cell 220 is stopped.

In the present embodiment, the BMS 230 controls the operations of the power accumulation unit 122. For example, the BMS 230 controls the electrical power supply to the vehicle 120 from the electric storage cell 220. Also, the BMS 230 manages the state of the power accumulation unit 122. The BMS 230 may manage the information indicating the state of the power accumulation unit 122.

In one embodiment, the BMS 230 stores information indicating the state of the power accumulation unit 122 output by the sensing unit 240 in the memory 250. In another embodiment, the BMS 230 stores at least a part of the information indicating the state of the vehicle 120 or the power accumulation unit 122 output by the sensing unit 126 in the memory 250. Furthermore in another embodiment, the BMS 230 may output the information indicating the measurement result of the sensing unit 240 to the ECU 134 or the assistance server 140.

In the present embodiment, the BMS 230 obtains a type code of the vehicle 120 when the power accumulation unit 122 is installed in the vehicle 120. The BMS 230 may determine data items stored in the memory 250 or the like based on the type or application of the vehicle 120 indicated by the above-mentioned type code. Details of the BMS 230 are described below.

In the present embodiment, the sensing unit 240 obtains information about at least one of the usage state and degradation state of the power accumulation unit 122. The sensing unit 240 outputs data related to various items regarding at least one of the usage state and degradation state of the power accumulation unit 122. In one embodiment, the sensing unit 240 outputs information indicating the measured value. In another embodiment, the sensing unit 240 outputs information indicating that the measured value is larger than the predetermined threshold when the measured value exceeds the predetermined threshold.

As the data item output by the sensing unit 240, at least one of the acceleration of the power accumulation unit 122, the number or frequency with which the acceleration of the power accumulation unit 122 exceeds the predetermined first threshold, the magnitude of the impact applied on the power accumulation unit 122, the number or frequency with which the magnitude of the impact applied on the power accumulation unit 122 exceeds the predetermined second threshold value, the inclination of the power accumulation unit 122, the number or frequency with which the inclination of the power accumulation unit 122 exceeds the predetermined third threshold, the number of charging or the charging frequency of the power accumulation unit 122, the accumulated value of the discharge capacity of the power accumulation unit 122, the accumulated value of the charging capacity of the power accumulation unit 122, and the operation environment of the power accumulation unit 122 is exemplified. As the operation environment of the power accumulation unit 122, the temperature of a specific location of the power accumulation unit 122, the humidity of a specific location of the power accumulation unit 122 and the like are exemplified.

The sensing unit 240 may include one or more sensors. As the above-mentioned sensor, an acceleration sensor for measuring the acceleration of the power accumulation unit 122, an angular acceleration sensor for measuring the angular acceleration of the power accumulation unit 122, a vibration sensor for measuring the magnitude of the vibration of the power accumulation unit 122, an inclination sensor for measuring the magnitude of the inclination of the power accumulation unit 122, an impact sensor for detecting the magnitude of the impact applied on the power accumulation unit 122, a voltage sensor for measuring the output voltage of the power accumulation unit 122, a current sensor for measuring the output current of the power accumulation unit 122, a voltage sensor for measuring the input voltage of the power accumulation unit 122, a current sensor for measuring the input current of the power accumulation unit 122, a charging cycle detection sensor for detecting the charging cycle of the power accumulation unit 122, the abnormality detection sensor for detecting anomalous of the power accumulation unit 122 and the like are exemplified. The number of charging or the charging frequency may be counted as one cycle from the end-of-discharge voltage to the end-of-charge voltage.

In the present embodiment, the memory 250 stores information about at least one of the usage state and degradation state of each of one or more power accumulation units 122. For example, the memory 250 stores, according to the control of the BMS 230, the type code stored in the storage unit 128 of the vehicle 120 with the power accumulation unit 122 installed therein, at least a part of the data output by the sensing unit 126, and at least a part of the data output by the sensing unit 240, in the history data storage unit 252.

In one embodiment, among the data output by the sensing unit 126 and the data output by the sensing unit 240, the data that has not been determined to be stored in the history data storage unit 252 by the BMS 230 is not stored in the memory 250. In another embodiment, among the data output by the sensing unit 126 and the data output by the sensing unit 240, the data that has not been determined to be stored in the history data storage unit 252 by the BMS 230 is stored in the buffer data storage unit 254.

In the present embodiment, the history data storage unit 252 stores the type code stored in the storage unit 128 of the vehicle 120 with a power accumulation unit 122 installed therein, at least a part of the data output by the sensing unit 126 and at least a part of the data output by the sensing unit 240. The history data storage unit 252 stores (i) the type code stored in the storage unit 128 of the vehicle 120 with a power accumulation unit 122 installed therein, (ii) the data that has not been determined to be stored in the history data storage unit 252 by the BMS 230 among the data output by the sensing unit 126 and the data output by the sensing unit 240.

In the present embodiment, the buffer data storage unit 254 temporarily stores the data that has not been determined to be stored in the history data storage unit 252 by the BMS 230 among the data output by the sensing unit 126 and the data output by the sensing unit 240, different from the history data storage unit 252. The storage period of the data stored in the buffer data storage unit 254 may be shorter than the storage period of the data stored in the history data storage unit 252.

In one embodiment, the data stored in the buffer data storage unit 254 is deleted after the elapse of a predetermined period. In another embodiment, the data stored in the buffer data storage unit 254 may be overwritten by other data. For example, when the recording capacity of the buffer data storage unit 254 becomes full, the data stored in the buffer data storage unit 254 is overwritten by other data.

The electric storage cell 220 may be one example of the member or the power accumulation apparatus. The BMS 230 may be one example of the information processing apparatus. The sensor included in the sensing unit 240 may be one example of the sensor installed in the members. The memory 250 may be one example of the first storage unit or the second storage unit. The history data storage unit 252 may be one example of the first storage unit. The buffer data storage unit 254 may be one example of the second storage unit.

One Example of Another Embodiment

In the present embodiment, the details of one example of the reuse assistance system 100 have been explained using the case where the power accumulation unit 122 is subject to reuse. However, the reuse assistance system 100 is not limited to the present embodiment. In another embodiment, the electric storage cell 220 may be subject to reuse.

Figure 3:
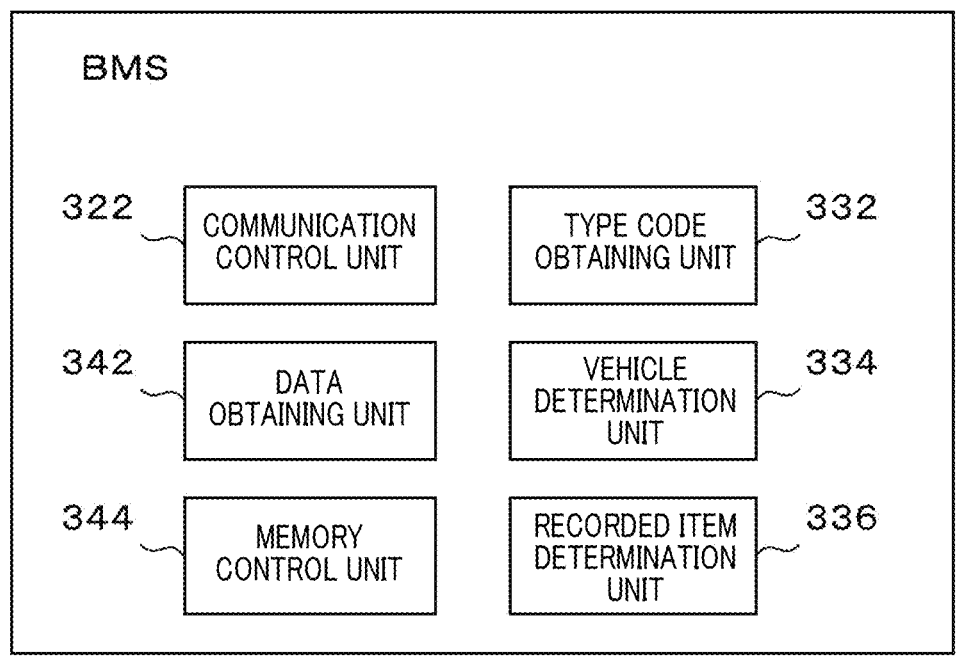
FIG. 3 schematically illustrates one example of an internal configuration of a BMS 230.

FIG. 3 schematically illustrates one example of an internal configuration of the BMS 230. In the present embodiment, the BMS 230 includes a communication control unit 322, a type code obtaining unit 332, a car type determination unit 334, a recorded item determination unit 336, a data obtaining unit 342, and a memory control unit 344.

In the present embodiment, the communication control unit 322 controls the communication between the power accumulation unit 122 and the vehicle 120. In one embodiment, the communication control unit 322 obtains the information flowing over the communication network (not illustrated) distributed in the vehicle 120. The communication control unit 322 may flow the information output by the sensing unit 240 over a communication network distributed in the vehicle 120 (not illustrated). In another embodiment, the communication control unit 322 accesses to the sensing unit 126 of the vehicle 120 and obtains information output by the sensing unit 126. The communication control unit 322 may access to the storage unit 128 of the vehicle 120 and obtain the information stored in the storage unit 128. Furthermore in another embodiment, the communication control unit 322 transmits and receives information between the ECU 134 of the vehicle 120 and itself. For example, the communication control unit 322 outputs the information output by the sensing unit 240 to the ECU 134. The communication control unit 322 may output the information stored in the memory 250 to the ECU 134, according to the request from the ECU 134.

The communication control unit 322 may determine whether to establish the communication between the power accumulation unit 122 and the vehicle 120. The communication control unit 322 may also output the signal indicating that the communication between the power accumulation unit 122 and the vehicle 120 has been established to the type code obtaining unit 332, when the communication between the power accumulation unit 122 and the vehicle 120 has been established.

In the present embodiment, the type code obtaining unit 332 obtains the type code stored in the storage unit 128 of the vehicle 120 when the power accumulation unit 122 is installed in the vehicle 120. In one embodiment, the type code obtaining unit 332 accesses to the storage unit 128 of the vehicle 120 and obtains the above-mentioned type code when the type code obtaining unit 332 has received a signal indicating that the communication between the power accumulation unit 122 and the vehicle 120 has been established from the communication control unit 322. In another embodiment, the type code obtaining unit 332 requests for the above-mentioned type code to the ECU 134 of the vehicle 120 when the type code obtaining unit 332 has received the signal indicating that communication has been established between the power accumulation unit 122 and the vehicle 120 from the communication control unit 322.

In the present embodiment, the car type determination unit 334 determines at least one of the type and application of the vehicle 120 with a power accumulation unit 122 installed therein. The car type determination unit 334 may determine at least one of the type and application of the vehicle 120 with the power accumulation unit 122 installed therein, based on the type code obtained by the type code obtaining unit 332.

In the present embodiment, the recorded item determination unit 336 determines the items stored in the history data storage unit 252 (sometimes referred to as stored items) among one or more items related to at least one of the usage state and degradation state of the power accumulation unit 122 (sometimes referred to as related items). The recorded item determination unit 336 may determine the stored items based on at least one of the type and application of the vehicle 120 determined by the car type determination unit 334.

As the above-mentioned related items, at least one item selected from a group comprising: (i) the number of power accumulation apparatus mountable to the vehicle 120, (ii) the number of power accumulation unit 122 actually installed in the vehicle 120, (iii) the geographical location of the vehicle 120 or the power accumulation unit 122, (iv) the acceleration of the vehicle 120 or the power accumulation unit 122, or the number or frequency with which the acceleration exceeds a predetermined first threshold, (v) the magnitude of the impact applied on the power accumulation unit 122 or the vehicle 120, or the number or frequency with which the magnitude of the impact exceeds a predetermined second threshold, (vi) the inclination of the vehicle 120 or the power accumulation unit 122, or the number or frequency with which the inclination of the vehicle 120 or the power accumulation unit 122 exceeds a predetermined third threshold, (vii) the number of charging or charging frequency of the power accumulation unit 122, (viii) the moving distance of the vehicle 120, (ix) the accumulated value of the discharge capacity of the power accumulation unit 122, (x) the temperature of the power accumulation unit 122, (xi) the type or application of the vehicle 120, is exemplified. The type or application of the vehicle 120 may be a type code.

[A Specific Example where the Vehicle 120 is a Motorcycle]

For example, the car type determination unit 334 determines that the vehicle 120 is a motorcycle that travels utilizing the electrical power accumulated in the power accumulation unit 122. In this case, the recorded item determination unit 336 determines, as the stored items, at least (i) the geographical location of the vehicle 120 or the power accumulation unit 122, (ii) the acceleration of the vehicle 120 or the power accumulation unit 122, or the number or frequency with which the acceleration exceeds a predetermined first threshold, (iii) the magnitude of the impact applied on the vehicle 120 or the power accumulation unit 122, or the number or frequency with which the magnitude of the impact applied exceeds a predetermined second threshold, (iv) the inclination of the vehicle 120 or the power accumulation unit 122, or the number or frequency with which the inclination of the vehicle 120 or the power accumulation unit 122 exceeds a predetermined third threshold, and (v) the number of charging or the charging frequency of the power accumulation unit 122.

The recorded item determination unit 336 may determine not to store the data related to the items other than the above-mentioned stored items in the history data storage unit 252. The recorded item determination unit 336 may determine to store the data related to the items other than the above-mentioned stored items in the buffer data storage unit 254.

When the power accumulation unit 122 is installed in a motorcycle, the power accumulation unit 122 is highly possible to be exposed to a harsher environment compared to the case where the power accumulation unit 122 is installed in an automobile. For example, if a motorcycle falls over, the power accumulation unit 122 may be physically damaged. For example, when a motorcycle is travelling, a pebble may hit the power accumulation unit 122, causing physical damage to the power accumulation unit 122. Also, when the motorcycle is turning, the driver of the motorcycle will incline the motorcycle. In addition, the capacity of the power accumulation unit 122 installed in a motorcycle is often smaller than the capacity of the power accumulation unit 122 installed in an automobile.

Therefore, according to the present embodiment, the recorded item determination unit 336 determines acceleration, impact, inclination, number of charging or charging frequency and moving distance or the like as the stored items. This can determine a more appropriate application for where to reuse the power accumulation unit 122.

[A Specific Example when the Vehicle 120 is a Bicycle]

For example, the car type determination unit 334 determines that the vehicle 120 is a bicycle that travels utilizing the electrical power accumulated in the power accumulation unit 122. In this case, the recorded item determination unit 336 determines at least (i) the magnitude of the impact applied to the vehicle 120 or the power accumulation unit 122, or the number or frequency with which the magnitude of the impact exceeded the predetermined second threshold, and (ii) the number of charging or charging frequency of the power accumulation unit 122 as stored items.

The recorded item determination unit 336 may determine not to store the data related to the items other than the above-mentioned stored items in the history data storage unit 252. The recorded item determination unit 336 may determine to store the data related to the items other than the above-mentioned stored items in the buffer data storage unit 254.

When the power accumulation unit 122 is installed in a motorcycle, the power accumulation unit 122 is highly possible to be exposed to a harsher environment compared to a case where the power accumulation unit 122 is installed in an automobile. On the other hand, when the power accumulation unit 122 is installed in an automobile, the power accumulation unit 122 is less possible to be exposed to harsh environment than when the power accumulation unit 122 is installed in a motorcycle.

Therefore, according to the present embodiment, the recorded item determination unit 336 determines, impact, the number of charging or charging frequency or the like as the stored items. This can determine a more appropriate application for where to reuse the power accumulation unit 122.

[A Specific Example when the Vehicle 120 is an Automobile]

For example, the car type determination unit 334 determines that the vehicle 120 is an automobile that travels utilizing the electrical power accumulated in the power accumulation unit 122. In this case, the recorded item determination unit 336 determines, at least, (i) the moving distance of the vehicle 120, (ii) the number of power accumulation units 122 actually installed in the vehicle 120, (iii) the type or application of the vehicle 120, and (iv) the magnitude of the impact applied to the vehicle 120 or the power accumulation units 122, or the number or frequency with which the magnitude of the impact exceeds a predetermined second threshold are determined as the stored items.

When the power accumulation unit 122 is installed in an automobile, the moving distance per trip is highly possible to be longer than when the power accumulation unit 122 is installed in, for example, a motorcycle or a bicycle with an electric motor. In addition, the types and applications of automobiles are more common than the types and applications of motorcycles or bicycles with an electric motor. Furthermore, the weight of an automobile is greater than the weight of an automatic motorcycle or bicycle with an electric motor. The weight of an automobile varies greatly depending on the types and applications of the automobile. The greater the weight of the vehicle 120 with the power accumulation unit 122 installed therein, the greater the output requirement for the power accumulation unit 122 can be.

Therefore, the progress level of degradation of the power accumulation unit 122 may vary greatly depending on the type and application of the automobile. For example, the progress level of degradation of the power accumulation unit 122 installed in a small automobile for home use may be greatly different from that of a power accumulation unit 122 installed in a truck for business use.

Therefore, according to the present embodiment, the recorded item determination unit 336 determines, moving distance of the vehicle 120, the type or application of the vehicle 120 or the like as the stored items. This can determine a more appropriate application for where to reuse the power accumulation unit 122.

The recorded item determination unit 336 may determine other items that have a large impact on the prediction of the degradation of the power accumulation unit 122 as stored items. For example, when the power accumulation unit 122 is installed in the lower part of the vehicle body, physical forces caused by the torsion of the vehicle body are applied to the power accumulation unit 122. The magnitude of the physical force due to the torsion of the vehicle body, for example, increases as the acceleration of the vehicle 120 increases.

Therefore, the recorded item determination unit 336 determines, for example, (i) the moving distance of the vehicle 120 and at least one of the types or applications of the vehicle 120, and (ii) the acceleration of the vehicle 120 as stored items. This further improves the accuracy of determining the application.

[A Specific Example when the Vehicle 120 is a Cultivator]

For example, the car type determination unit 334 determines that the vehicle 120 is a cultivator that travels utilizing the electrical power accumulated in the power accumulation unit 122. In this case, the recorded item determination unit 336 determines at least (i) the geographical location of the vehicle 120 or the power accumulation unit 122 as a stored item.

Working machines such as cultivators are often driven on rough roads compared to automobiles or the like. Areas where the road environment is worse than a predetermined standard can be determined, for example, by the geographical location of the area.

Therefore, according to the present embodiment, the recorded item determination unit 336 determines the geographical location of the vehicle 120 or the power accumulation unit 122 as the stored item. For example, by referring to a database that corresponds to the geographical location of one or more areas to the road environment at that location, the road environment at the geographical location of the vehicle 120 or the power accumulation unit 122 can be extracted. The above-mentioned database may be a database that stores the geographical locations of areas where the road environment is worse than a predetermined standard or areas where the road environment is better than a predetermined standard. This can determine a more appropriate application for where to reuse the power accumulation unit 122.

Also, if the power accumulation unit 122 is installed in a cultivator, for example, the acceleration in the vertical direction (which may be the up-down direction of the vehicle 120) and/or the acceleration in the front-back direction of the vehicle 120 is highly possible to be greater than if the power accumulation unit 122 is installed in an automobile. When the power accumulation unit 122 is installed in a cultivator, for example, the vibration or impact applied to the power accumulation unit 122 is highly possible to be greater than when the power accumulation unit 122 is installed in an automobile.

Therefore, according to the present embodiment, the recorded item determination unit 336 determines at least one of, as a stored item, the acceleration in the vertical direction, the acceleration in the up-down direction of the vehicle 120, the acceleration in the front-back direction of the vehicle 120, the vibration applied to the power accumulation unit 122, and the impact applied to the power accumulation unit 122. For example, the recorded item determination unit 336 determines, as a stored item, at least one of the magnitude of the above-mentioned acceleration, the number or frequency with which the magnitude of the above acceleration exceeds a predetermined value, the direction and magnitude of the above-mentioned acceleration, the magnitude of the above-mentioned vibration, the number or frequency with which the magnitude of the above-mentioned vibration exceeds a predetermined value, the frequency of the above-mentioned vibration, the magnitude of the above-mentioned impact, the number or frequency with which the magnitude of the above mentioned impact exceeds a predetermined value, and the direction and magnitude of the impact. At least one of displacement, velocity, and acceleration is exemplified as the magnitude of vibration. This can determine a more appropriate application for where to reuse the power accumulation unit 122.

[A Specific Example when the Vehicle 120 is a Boat]

For example, the car type determination unit 334 determines that the vehicle 120 is a boat that travels utilizing the electrical power accumulated in the power accumulation unit 122. In this case, the recorded item determination unit 336 determines at least (i) the geographical location of the vehicle 120 or the power accumulation unit 122 as a stored item.

A boat and other marine vessels often navigate with much more up-down and left-right motion than an automobile or the like. In addition, a boat and other marine vessel are repeatedly subjected to large vibrations caused by waves as they navigate. The area that a marine vessel can navigate can be determined, for example, by the geographical location of the area. Also, the state of the waves can be determined, for example, by the geographical location. The state of the waves may be distinguished by the type of water body. The type of water body can be determined, for example, by the geographical location of the water body. As the type of the water body, river, lake, port, coastal water, inland sea, open sea and the like are exemplified.

Therefore, according to the present embodiment, the recorded item determination unit 336 determines the geographical location of the vehicle 120 or the power accumulation unit 122 as the stored item. This can determine a more appropriate application for where to reuse the power accumulation unit 122.

Also, if the power accumulation unit 122 is installed in a relatively small marine vessel such as a boat, for example, the acceleration in the vertical direction (which may be the up-down direction of the vehicle 120), the acceleration in the left-right direction of the vehicle 120 and/or front-back direction of the vehicle 120 is highly possible to be greater than if the power accumulation unit 122 is installed in an automobile. When the power accumulation unit 122 is installed in a relatively small marine vessel such as a boat, for example, vibrations with a longer period and higher acceleration are applied to the power accumulation unit 122 compared to when the power accumulation unit 122 is installed in an automobile.

Therefore, according to the present embodiment, the recorded item determination unit 336 determines at least one of, as a stored item, the acceleration in the vertical direction, the acceleration in the up-down direction of the vehicle 120, the acceleration in the left-right direction of the vehicle 120, the acceleration in the front-back direction of the vehicle 120, the vibration applied to the power accumulation unit 122, and the impact applied to the power accumulation unit 122. For example, the recorded item determination unit 336 determines, as a stored item, at least one of the magnitude of the above-mentioned acceleration, the number or frequency with which the magnitude of the above acceleration exceeds a predetermined value, the direction and magnitude of the above-mentioned acceleration, the magnitude of the above-mentioned vibration, the number or frequency with which the magnitude of the above-mentioned vibration exceeds a predetermined value, the frequency of the above-mentioned vibration, the magnitude of the above-mentioned impact, the number or frequency with which the magnitude of the above mentioned impact exceeds a predetermined value, and the direction and magnitude of the impact. At least one of displacement, velocity, and acceleration is exemplified as the magnitude of vibration. This can determine a more appropriate application for where to reuse the power accumulation unit 122.

In the present embodiment, the data obtaining unit 342 obtains various types of information (sometimes referred to as state information) regarding at least one of the usage state and degradation state of the power accumulation unit 122 installed in the vehicle 120. The data obtaining unit 342, for example, obtains the data output by at least one of the sensing unit 126 and the sensing unit 240 as state information.

As described above, the sensing unit 126 includes one or more sensors. The data output by the sensing unit 126 includes information indicating the measurement results of each of the one or more sensors included in the sensing unit 126. The data output by the sensing unit 126 may include information indicating the time and information indicating the measurement results of each sensor at that time. The sensing unit 126 may output the measurement results of each of a plurality of sensors as different data. The sensing unit 126 may combine the measurement results of a plurality of sensors into a single data output.

Similarly, the sensing unit 240 includes one or more sensors. The data output by the sensing unit 240 includes information indicating the measurement results of each of the one or more sensors included in the sensing unit 240. The data output by the sensing unit 240 may include information indicating the time and information indicating the measurement results of each sensor at that time. The sensing unit 240 may output the measurement results of each of a plurality of sensors as different data. The sensing unit 240 may combine the measurement results of a plurality of sensors into a single data output.

The measurement result of a single sensor, for example, corresponds to a single related item. According to the present embodiment, the data output by the sensing unit 126 includes at least one piece of information indicating the contents of each of one or more related items (sometimes referred to as related item information). Also, the data output by the sensing unit 240 includes at least one piece of information indicating the contents of each of one or more related items.

The data obtaining unit 342 collects the data output by at least one of the sensing unit 126 and the sensing unit 240 according to instructions from the memory control unit 344. In one embodiment, the data obtaining unit 342 collects not only data related to the stored items determined by the recorded item determination unit 336, but also data related to related items other than the stored items determined by the recorded item determination unit 336. For example, the data obtaining unit 342 obtains all the data that can be collected. In another embodiment, the data obtaining unit 342 obtains data related to the stored items determined by the recorded item determination unit 336 among the data that can be collected.

The data obtaining unit 342, stores the data output by at least one of the sensing unit 126 and the sensing unit 240 in the memory 250. For example, the data obtaining unit 342 stores, in the history data storage unit 252, at least a part of the data output by at least one of the sensing unit 126 and the sensing unit 240 according to instructions from the memory control unit 344. Also, the data obtaining unit 342 stores, in the buffer data storage unit 254, at least a part of the data output by at least one of the sensing unit 126 and the sensing unit 240 according to instructions from the memory control unit 344.

In the present embodiment, the memory control unit 344 controls operation of the data obtaining unit 342. Specifically, the memory control unit 344, for example, controls the operations of the data obtaining unit 342 to collect data. The memory control unit 344 may control the operations of the data obtaining unit 342 to store information in the memory 250.

In one embodiment, the memory control unit 344 controls the data obtaining unit 342 to collect not only data related to the stored items determined by the recorded item determination unit 336, but also data related to related items other than the stored items determined by the recorded item determination unit 336. For example, the memory control unit 344 controls the data obtaining unit 342 to obtain all the data that can be collected.

Next, the memory control unit 344 controls the data obtaining unit 342 to determine, for each of at least one piece of related item information included in each data collected by the data obtaining unit 342, whether or not to store the related item information in the history data storage unit 252. In this case, the data obtaining unit 342 performs the above determination process for each of the one or more data collected by the data obtaining unit 342. In addition, the data obtaining unit 342 stores information in the memory 250 according to the determination result.

Specifically, the data obtaining unit 342 determines whether or not each item of at least one piece of related item information included in each data corresponds to a stored item determined by the recorded item determination unit 336. Then, the data obtaining unit 342 determines to store in the history data storage unit 252 the related item information related to the stored item determined by the recorded item determination unit 336 among at least one piece of related item information included in each data obtained by the data obtaining unit 342. On the other hand, the data obtaining unit 342 determines to (i) discard or (ii) store in the buffer data storage unit 254 the related item information related to items other than the stored items determined by the recorded item determination unit 336, among at least one piece of related item information included in each data obtained by the data obtaining unit 342.

As described above, the data output by the sensing unit 126 or sensing unit 240 may include information indicating the time and information indicating the measurement results of each sensor at that time. The data obtaining unit 342 may store the information indicating the measurement results of the sensor corresponding to the stored item determined by the recorded item determination unit 336 to the information indicating the above time, and stores the corresponding information, among the information indicating the measurement results of each sensor included in the data output by the sensing unit 126 or the sensing unit 240, in the history data storage unit 252.

On the other hand, it is possible that the data output by the sensing unit 126 or the sensing unit 240 does not include information indicating the time. In this case, the data obtaining unit 342 may store the information indicating the measurement results of the sensor corresponding to the stored item determined by the recorded item determination unit 336 to the information indicating the time when the data obtaining unit 342 obtained the above mentioned data, for example, and stores the corresponding information, among the information indicating the measurement results of each sensor included in the data output by the sensing unit 126 or the sensing unit 240, in the history data storage unit 252.

In another embodiment, the memory control unit 344 controls the data obtaining unit 342 to collect data related to the stored items determined by the recorded item determination unit 336. In this case, the data obtaining unit 342 obtains the related item information indicating the contents of the stored item determined by the recorded item determination unit 336. On the other hand, the data obtaining unit 342 does not obtain related item information indicating the contents of items other than the stored items determined by the recorded item determination unit 336. In addition, the memory control unit 344 controls the data obtaining unit 342 to store the data collected by the data obtaining unit 342 in the history data storage unit 252.

The type code obtaining unit 332 may be one example of the type information obtaining unit. The car type determination unit 334 may be one example of the mobile object determination unit. The recorded item determination unit 336 may be one example of the item determination unit. The data obtaining unit 342 may be one example of the state information obtaining unit or a related item information obtaining unit. The data obtaining unit 342 may be one example of the related item information control unit. The memory control unit 344 may be one example of the item determination unit or the related item information control unit. The data output by the sensing unit 126 may be one example of the state information or the related item information. The data output by the sensing unit 240 may be one example of the state information or the related item information.

Figure 4:
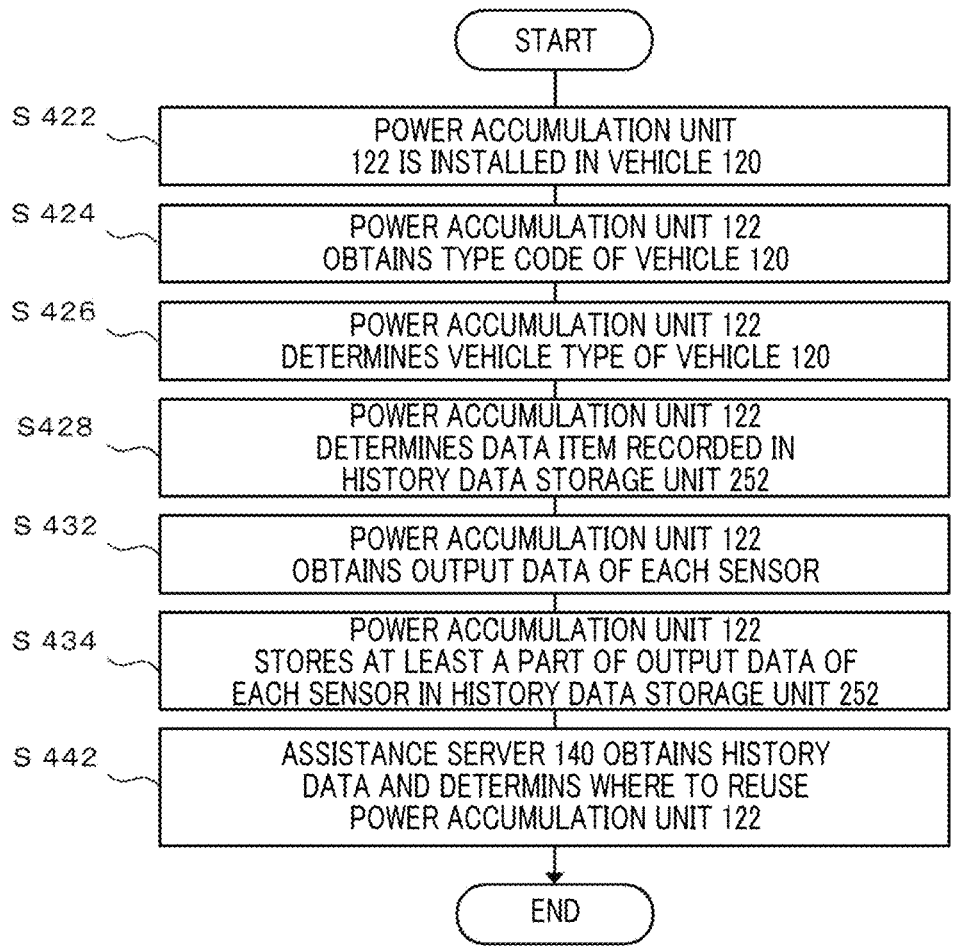
FIG. 4 schematically illustrates one example of information processing in the reuse assistance system 100.

FIG. 4 schematically illustrates one example of the information processing in the reuse assistance system 100. According to the present embodiment, first, in step 422 (step may be abbreviated as S), the power accumulation unit 122 is installed in the vehicle 120. When the power accumulation unit 122 is installed in the vehicle 120 and communication between the power accumulation unit 122 and the vehicle 120 is established, the communication control unit 322 of the BMS 230 outputs a signal to the type code obtaining unit 332 indicating that communication between the power accumulation unit 122 and the vehicle 120 has been established. Then, in 5424, the type code obtaining unit 332 obtains the type code stored in the storage unit 128 of the vehicle 120.

Then, in 5426, the car type determination unit 334 of the BMS 230 determines at least one of the type and application of the vehicle 120 with a power accumulation unit 122 installed therein, based on the type code obtained by the type code obtaining unit 332. Also, in 5428, the recorded item determination unit 336 of the BMS 230 determines a stored item to be stored in the history data storage unit 252 among one or more related items that are related to at least one of the usage state and the degradation state of the power accumulation unit 122.

Then, in 5432, the data obtaining unit 342 of the BMS 230 collects the data output by at least one sensor included in the sensing unit 126 and the sensing unit 240, according to the instructions of the memory control unit 344. Also, in 5434, the data obtaining unit 342 of the BMS 230 stores at least some of the collected data in the history data storage unit 252 according to the instructions of the memory control unit 344.

Next, in 5442, the history data obtaining unit 142 of the assistance server 140 obtains the information stored in the history data storage unit 252. The history data obtaining unit 142 may store the information that has been stored in the history data storage unit 252 in the history data storage unit 144.

In one embodiment, the history data obtaining unit 142 requests the ECU 134 of the vehicle 120 with a power accumulation unit 122 installed therein to transmit the information stored in the history data storage unit 252 of the power accumulation unit 122. In another embodiment, the history data obtaining unit 142 obtains information stored in the history data storage unit 252 of the power accumulation unit 122 via the communication terminal 30 connected to the vehicle 120 or the power accumulation unit 122.

Also, the remaining life estimation unit 146 of the assistance server 140 estimates the remaining life of the power accumulation unit 122 by referring to the information stored in the history data obtaining unit 142. The application determination unit 148 of the assistance server 140 determines the next application when the power accumulation unit 122 is removed from the vehicle 120 and reused, based on the remaining life of the power accumulation unit 122 estimated by the remaining life estimation unit 146.

In the present embodiment, when the power accumulation unit 122 is installed in the vehicle 120, the BMS 230 distributed in the power accumulation unit 122 obtains the type code of the vehicle 120 from the vehicle 120. The BMS 230 distributed in the power accumulation unit 122 determines the type of data to be stored in the memory 250 distributed in the power accumulation unit 122 based on the type code of the vehicle 120.

This can reduce the number of data items to be collected. As a result, the capacity of data used in the process of determining where to reuse the power accumulation unit 122 in the assistance server 140 is reduced. As a result, the collected data can be stored for a relatively long period of time in a recording apparatus located in the vehicle 120 or in the power accumulation unit 122. Therefore, this prevents the dissipation of useful data even when the vehicle 120 or power accumulation unit 122 is distributed from one place to another in the second-hand market. In addition, the calculation amount and calculation time in the process of determining where to reuse the power accumulation unit 122 can be reduced.

Also, according to the present embodiment, the amount of data to be collected is also reduced. As a result, the transmission time of the collected data to the assistance server 140 is reduced. This can reduce the processing time of the remaining life estimation process. For example, when estimating the remaining life in real time, the overall time of the remaining life estimation process is expressed as the sum of the data transmission time and the data processing time. According to the present embodiment, the overall time for the remaining life estimation process is greatly reduced because the data transmission time and processing time are reduced.

One Example of Another Embodiment

In the present embodiment, details of one example of the reuse assistance system 100 have been described using the case where the recorded item determination unit 336 determines the items to be stored in the history data storage unit 252 among one or more items related to at least one of the usage state and the degradation state of the power accumulation unit 122. However, the reuse assistance system 100 is not limited to the present embodiment.

In another embodiment, the recorded item determination unit 336 may determine the items to be stored in the storage unit 128 or the history data storage unit 144 among one or more items related to at least one of the usage state and the degradation state of the power accumulation unit 122. For example, when the recorded item determination unit 336 determines the items to be stored in the history data storage unit 144 among one or more items related to at least one of the usage state and the degradation state of the power accumulation unit 122, the recorded item determination unit 336 selects information transmitted to the history data storage unit 144 via the TCU 132, among the data output by the sensing unit 126 or the sensing unit 240.

In the present embodiment, the details of one example of the reuse assistance system 100 were explained using the case where the BMS 230 of the power accumulation unit 122 determines the stored item from among one or more related items. In other words, the details of one example of the reuse assistance system 100 have been explained using the case where the stored items are determined in the information processing apparatus distributed in the power accumulation unit 122 as one example. However, the reuse assistance system 100 is not limited to the present embodiment.

In another embodiment, a part of the functions of the BMS 230 may be realized by the ECU 134. In other words, the information processing apparatus described above may be distributed outside the power accumulation unit 122. For example, at least a part of the type code obtaining unit 332, the data obtaining unit 342, the car type determination unit 334, the recorded item determination unit 336 and the memory control unit 344 may be distributed to the ECU 134. In the above-mentioned embodiment, the vehicle 120 may be one example of an information processing apparatus. The ECU 134 may be one example of the information processing apparatus.

Furthermore in another embodiment, a part of the functions of the BMS 230 may be realized by the assistance server 140. For example, at least a part of the type code obtaining unit 332, the data obtaining unit 342, the car type determination unit 334, the recorded item determination unit 336 and the memory control unit 344 may be distributed to the assistance server 140. Also, at least a part of the functions of the data obtaining unit 342 may be realized by the history data obtaining unit 142. In the above-mentioned embodiment, the assistance server 140 may be one example of the information processing apparatus or the information processing system.

Figure 5:
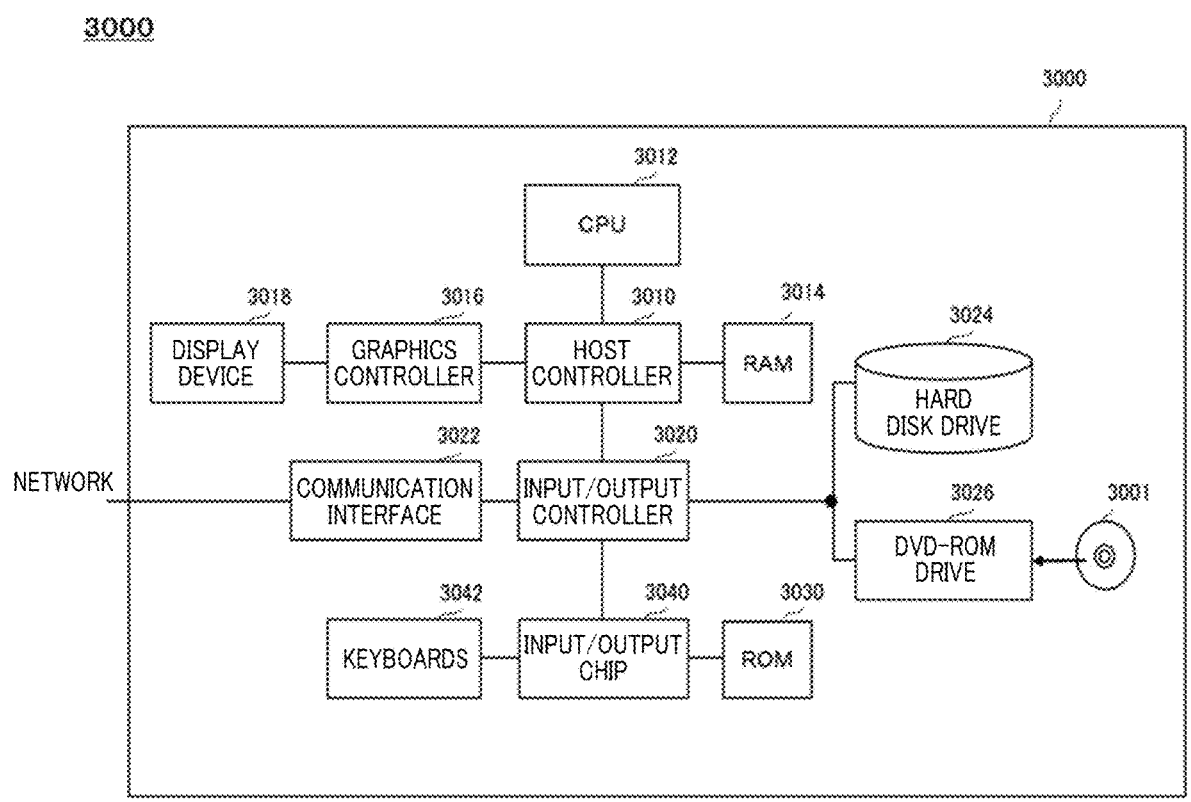
FIG. 5 schematically illustrates one example of a system configuration of a computer 3000.

FIG. 5 schematically illustrates one example of a computer 3000, in which a plurality of embodiments of the present invention may be entirely or partly realized. For example, the TCU 132 is realized by the computer 3000. For example, the ECU 134 is realized by the computer 3000. For example, the assistance server 140 is realized by the computer 3000.

A program that is installed in the computer 3000 can cause the computer 3000 to perform an operation associated with an apparatus according to the embodiment of the present invention or to function as one or more "units" of the apparatus, or cause the computer 3000 to perform the operation or the one or more units thereof, and/or cause the computer 3000 to perform processes of the embodiment of the present invention or steps thereof. Such a program may be executed by the CPU 3012 to cause the computer 3000 to perform particular operations associated with some or all of the blocks of flowcharts and block diagrams described herein.

The computer 3000 in accordance with the present embodiment includes a CPU 3012, a RAM 3014, a graphics controller 3016, and a display device 3018, which are mutually connected by a host controller 3010. The computer 3000 also includes an input/output unit such as a communication interface 3022, a hard disk drive 3024, a DVD-ROM drive 3026, and an IC card drive, which are connected to the host controller 3010 via the input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The graphics controller 3016 acquires image data generated by the CPU 3012 on a frame buffer or the like provided in the RAM 3014 or in itself, and causes the image data to be displayed on a display device 3018.

The communication interface 3022 communicates with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads the program and data from the IC card, and/or writes the program and data to the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by a computer readable storage medium, such as the DVD-ROM 3001 or the IC card. The program is read from the computer readable storage medium, installed into the hard disk drive 3024, RAM 3014, or ROM 3030, which are also examples of computer readable storage medium, and performed by the CPU 3012. The information processing described in these programs is read into the computer 3000, resulting in cooperation between a program and the above-described various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under the control of the CPU 3012, reads the transmission data stored in the transmission buffer area provided in the recording medium such as RAM 3014, hard disk drive 3024, DVD-ROM 3001, or IC card, and sends the read transmission data to the network or writes the received data from the network to the reception buffer area provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and perform various types of processing on the data on the RAM 3014. The CPU 3012 may then write back the processed data to the external recording medium.

Various types of programs, data, table and various types of information such as a database may be stored in a storage medium to receive information processing. The CPU 3012 may perform various types of processing on the data read from the RAM 3014, which includes various types of operations, information processing, condition judging, conditional branch, unconditional branch, search/replacement of information, etc., as described throughout this disclosure and designated by an command sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above-described program or software modules may be stored in the computer readable storage medium on or near the computer 3000. In addition, a recording medium such as a hard disk or a RAM provided in a server system connected to a dedicated communication network or the Internet can be used as the computer readable storage medium, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. Further, to the extent that there is no technical contradiction, the matters described for the specific embodiment can be applied to other embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: communication network; 20: user; 30: communication terminal; 100: reuse assistance system; 120: vehicle; 122: power accumulation unit; 124: driving unit; 126: sensing unit; 128: storage unit; 132: TCU; 134: ECU; 140: assistance server; 142: history data obtaining unit; 144: history data storage unit; 146: remaining life estimation unit; 148: application determination unit; 220: electric storage cell; 230: BMS; 240: sensing unit; 250: memory; 252: history data storage unit; 254: buffer data storage unit; 322: communication control unit; 332: type code obtaining unit; 334: car type determination unit; 336: recorded item determination unit; 342: data obtaining unit; 344: memory control unit; 3000: computer; 3001: DVD-ROM; 3010: host controller; 3012: CPU; 3014: RAM; 3016: graphics controller; 3018: display device; 3020: input/output controller; 3022: communication interface; 3024: hard disk drive; 3026: DVD-ROM drive; 3030: ROM; 3040: input/output chip; 3042: keyboards

What is claimed is:

1. An information processing apparatus distributed in a member configured to be removable in a mobile object, the information processing apparatus comprising:
    at least one processor;
    a type information obtaining unit, configured to obtain, using the at least one processor, type information to distinguish at least one of a type and an application of the mobile object, when the member is installed in the mobile object;
    a mobile object determination unit, configured to determine, using the at least one processor, the at least one of the type and the application of the mobile object in which the member is installed, based on the type information obtained by the type information obtaining unit; and
    an item determination unit, configured to determine, using the at least one processor, an item to be stored in a first storage unit among one or more items related to at least one of a usage state and a degradation state of the member installed in the mobile object, based on the at least one of the type and the application of the mobile object determined by the mobile object determination unit, wherein
    the first storage unit is configured to store information related to the at least one of the usage state and the degradation state of a member for each of one or more of the members.

2. The information processing apparatus according to claim 1, further comprising
    a state information obtaining unit, configured to obtain, using the at least one processor, state information including at least one piece of related item information indicating contents of items related to the at least one of the usage state and the degradation state of the members installed in the mobile object,
    wherein the item determination unit is configured to determine, using the at least one processor, whether to store the related item information for each of at least one piece of the related item information included in the state information obtained by the state information obtaining unit, in the first storage unit.

3. The information processing apparatus according to claim 1, further comprising
    a related item information obtaining unit, configured to obtain, using the at least one processor, related item information indicating contents of an item determined by the item determination unit, which is information about the at least one of the usage state and the degradation state of the member installed in the mobile object.

4. The information processing apparatus according to claim 1, wherein
    the members are a power accumulation apparatus.

5. An information processing system for assisting reuse of a member installed in a mobile object, the information processing system comprising:
    an information processing apparatus according to claim 1;
    a remaining life estimation unit, configured to estimate, using the at least one processor, remaining life of the member, referring to information stored in the first storage unit; and
    an application determination unit, configured to determine, using the at least one processor, a next application when the member is removed from the mobile object and reused, based on the remaining life of the member estimated by the remaining life estimation unit.

6. The information processing apparatus according to claim 2, further comprising
    a related item information control unit, configured to determine, using the at least one processor, (a) to store, in the first storage unit, related item information related to an item determined to be stored in the first storage unit by the item determination unit, among at least one piece of the related item information included in the state information obtained by the state information obtaining unit, and (b) to (i) discard or (ii) store, in a second storage unit different from the first storage unit, related item information related to an item other than an item determined to be stored in the first storage unit by the item determination unit, among at least one piece of the related item information included in the state information obtained by the state information obtaining unit.

7. The information processing apparatus according to claim 2, wherein
    the related item information includes information indicating a measurement result of a sensor installed in the mobile object or the member.

8. The information processing apparatus according to claim 2, wherein
    the members are a power accumulation apparatus.

9. The information processing apparatus according to claim 4, wherein
    the one or more items related to the at least one of the usage state and the degradation state of the member includes at least one item selected from a group comprising: (i) a number of the power accumulation apparatus mountable to the mobile object, (ii) a number of the power accumulation apparatus actually installed in the mobile object, (iii) a geographical location of the mobile object or the power accumulation apparatus, (iv) acceleration of the mobile object or the power accumulation apparatus, or a number or frequency with which the acceleration exceeds a predetermined first threshold, (v) a magnitude of an impact applied on the mobile object or the power accumulation apparatus, or a number or frequency with which the magnitude of the impact exceeds a predetermined second threshold, (vi) an inclination of the mobile object or the power accumulation apparatus, or a number or frequency with which the inclination of the mobile object or the power accumulation apparatus exceeds a predetermined third threshold, (vii) a number of charging or a charging frequency of the power accumulation apparatus, (viii) a moving distance of the mobile object, (ix) an accumulated value of a discharge capacity of the power accumulation apparatus, (x) temperature of the power accumulation apparatus, (xi) a type or an application of the mobile object.

10. The information processing apparatus according to claim 4, wherein
the item determination unit is configured to determine, using the at least one processor, as items to be stored in the first storage unit, in a case where the mobile object determination unit has determined that the mobile object is a motorcycle travelling by utilizing electrical energy accumulated in the power accumulation apparatus, at least (i) a geographical location of the mobile object or the power accumulation apparatus, (ii) acceleration of the mobile object or the power accumulation apparatus, or a number or frequency with which the acceleration exceeds a predetermined first threshold, (iii) a magnitude of an impact applied on the mobile object or the power accumulation apparatus, or a number or frequency with which the magnitude of the impact applied exceeds a predetermined second threshold, (iv) an inclination of the mobile object or the power accumulation apparatus, or a number or frequency with which the inclination of the mobile object or the power accumulation apparatus exceeds a predetermined third threshold, and (v) a number of charging or a charging frequency of the power accumulation apparatus.

11. The information processing apparatus according to claim 4, wherein
the item determination unit is configured to determine, using the at least one processor, as the item to be stored in the first storage unit, in a case where the mobile object determination unit has determined that the mobile objects is a bicycle travelling by utilizing electrical energy accumulated in the power accumulation apparatus, at least (i) a magnitude of an impact applied on the mobile object or the power accumulation apparatus, or a number or frequency with which the magnitude of the impact applied exceeds a predetermined second threshold, and (ii) a number of charging or a charging frequency of the power accumulation apparatus.

12. The information processing apparatus according to claim 4, wherein
the item determination unit is configured to determine, using the at least one processor, as the item to be stored in the first storage unit, in a case where the mobile object determination unit has determined that the mobile objects is an automobile travelling by utilizing electrical energy accumulated in the power accumulation apparatus, at least (i) a moving distance of the mobile object, (ii) a number of the power accumulation apparatus actually installed in the mobile object, (iii) a type or an application of the mobile object, and (iv) a magnitude of an impact applied on the mobile object or the power accumulation apparatus, or a number or frequency with which the magnitude of the impact applied exceeds a predetermined second threshold.

13. The information processing apparatus according to claim 4, wherein
the item determination unit is configured to determine, using the at least one processor, as the item to be stored in the first storage unit, in a case where the mobile object determination unit has determined that the mobile objects is a cultivator or a marine vessel travelling by utilizing electrical energy accumulated in the power accumulation apparatus, at least (i) a geographical location of the mobile object or the power accumulation apparatus.

14. The information processing apparatus according to claim 6, wherein
the related item information includes information indicating a measurement result of a sensor installed in the mobile object or the member.

15. The information processing apparatus according to claim 9, wherein
the item determination unit is configured to determine, using the at least one processor, as items to be stored in the first storage unit, in a case where the mobile object determination unit has determined that the mobile object is a motorcycle travelling by utilizing electrical energy accumulated in the power accumulation apparatus, at least (i) a geographical location of the mobile object or the power accumulation apparatus, (ii) acceleration of the mobile object or the power accumulation apparatus, or a number or frequency with which the acceleration exceeds a predetermined first threshold, (iii) a magnitude of an impact applied on the mobile object or the power accumulation apparatus, or a number or frequency with which the magnitude of the impact applied exceeds a predetermined second threshold, (iv) an inclination of the mobile object or the power accumulation apparatus, or a number or frequency with which the inclination of the mobile object or the power accumulation apparatus exceeds a predetermined third threshold, and (v) a number of charging or a charging frequency of the power accumulation apparatus.

16. An information processing apparatus, comprising:
at least one processor;
a type obtaining unit configured to obtain, using the at least one processor, type information for distinguishing a mobile object by at least one of a type and an application of the mobile object, when a member is installed in the mobile object;
a mobile object determination unit, configured to determine, using the at least one processor, the at least one of the type and the application of the mobile object in which the member is installed, based on the type information obtained by the type obtaining unit; and
an item determination unit, configured to determine, using the at least one processor, based on the type information obtained by the type obtaining unit, an item to be stored in a first storage unit, among one or more items related to at least one of a usage state and a degradation state of the member installed in the mobile object, wherein the first storage unit is configured to store information indicating the at least one of the usage state and the degradation state of a member for each of one or more of the members.

17. An information processing system for assisting reuse of a member installed in a mobile object, the information processing system comprising:
an information processing apparatus according to claim 16;
a remaining life estimation unit, configured to estimate, using the at least one processor, remaining life of the member, referring to information stored in the first storage unit; and
an application determination unit, configured to determine, using the at least one processor, a next application when the member is removed from the mobile object and reused, based on the remaining life of the member estimated by the remaining life estimation unit.

18. A non-transitory computer-readable medium containing computer instructions stored therein for causing a computer processor to perform operations comprising:
obtaining, by an information processing apparatus distributed to a member, type information to distinguish at least one of a type and an application of a mobile object, when the member configured to be removable from the mobile object is installed in the mobile object;
determining, by the information processing apparatus, the at least one of the type and the application of the mobile object in which the member is installed, based on the type information obtained in obtaining the type information; and
determining an item to be stored in a first storage unit among one or more items related to at least one of a usage state and a degradation state of the member installed in the mobile object, based on the at least one of the type and the application of the mobile object determined in determining the at least one of the type and the application of the mobile object, wherein the first storage unit is configured to store information related to the at least one of the usage state and the degradation state of a member for each of one or more of the members.

19. An information processing method, comprising:

obtaining, by an information processing apparatus distributed to a member, type information to distinguish at least one of a type and an application of a mobile object, when the member configured to be removable from the mobile object is installed in the mobile object;

determining, by the information processing apparatus, the at least one of the type and the application of the mobile object in which the member is installed, based on the type information obtained in obtaining the type information; and determining an item to be stored in a first storage unit among one or more items related to at least one of a usage state and a degradation state of the member installed in the mobile object, based on the at least one of the type and the application of the mobile object determined in determining the at least one of the type and the application of the mobile object, wherein the first storage unit is configured to store information related to the at least one of the usage state and the degradation state of a member for each of one or more of the members.

\* \* \* \* \*